United States Patent

[11] 3,533,444

| [72] | Inventor | John K. Lyon |
| | | Pasadena, California |
| [21] | Appl. No. | 725,861 |
| [22] | Filed | May 1, 1968 |
| [45] | Patented | Oct. 13, 1970 |
| [73] | Assignee | Price-Pfister Brass Mfg. Co. |
| | | Pacoima, California |
| | | a corporation of California |

[54] LOW NOISE LEVEL VALVE STRUCTURE
30 Claims, 7 Drawing Figs.
[52] U.S. Cl. .................................................. 137/625.17
[51] Int. Cl. .................................................. F16k 11/00
[50] Field of Search ..................................... 137/625.17, 636.4

[56] References Cited
UNITED STATES PATENTS
| 3,035,612 | 5/1962 | Lyon .......................... | 137/625.17 |
| 3,324,884 | 6/1967 | Dornaus .................... | 137/625.17 |
| 3,433,264 | 3/1969 | Parkison .................... | 137/625.17 |

Primary Examiner—William R. Cline
Attorney—Flam and Flam

ABSTRACT: The mixing valve includes a valve casting having hot and cold water inlets and an outlet. Ceramic plates cooperate to control the flow, one being fixed and the other being confined for movement in a radial coordinate system about an axis. Sloping end walls of the fixed plate and sloping walls at the ends of the valve plate cavity smooth the flow course. A septum directs flow to the outlet under imbalanced flow conditions. Straight edges provide rapid shutoff.

Patented Oct. 13, 1970
3,533,444
Sheet 1 of 2
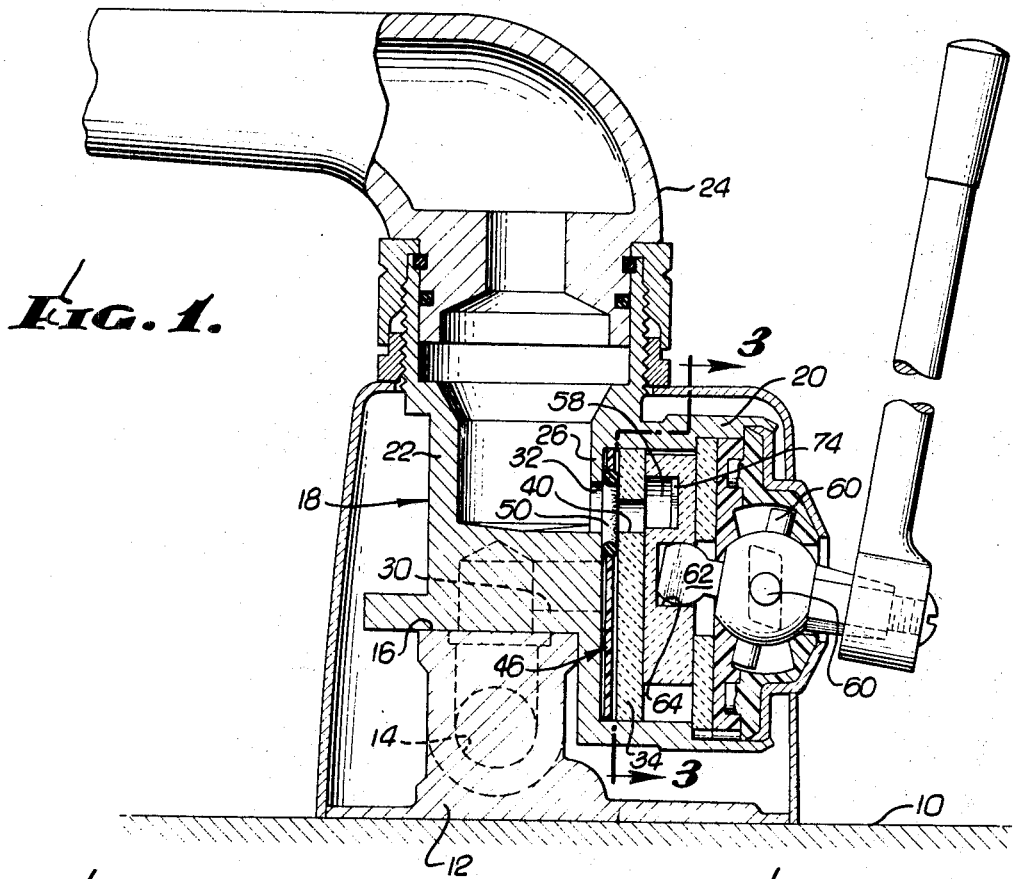
FIG. 1.
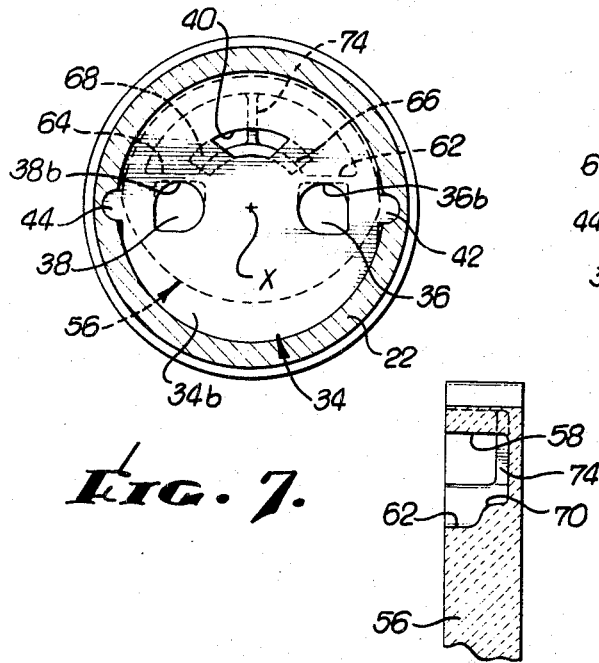
FIG. 3.
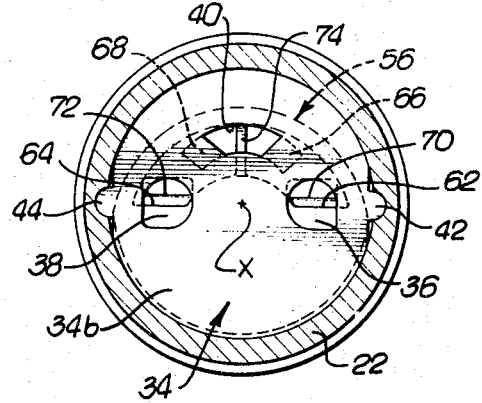
FIG. 4.
FIG. 7.
INVENTOR.
JOHN K. LYON
BY Flam and Flam
ATTORNEYS.

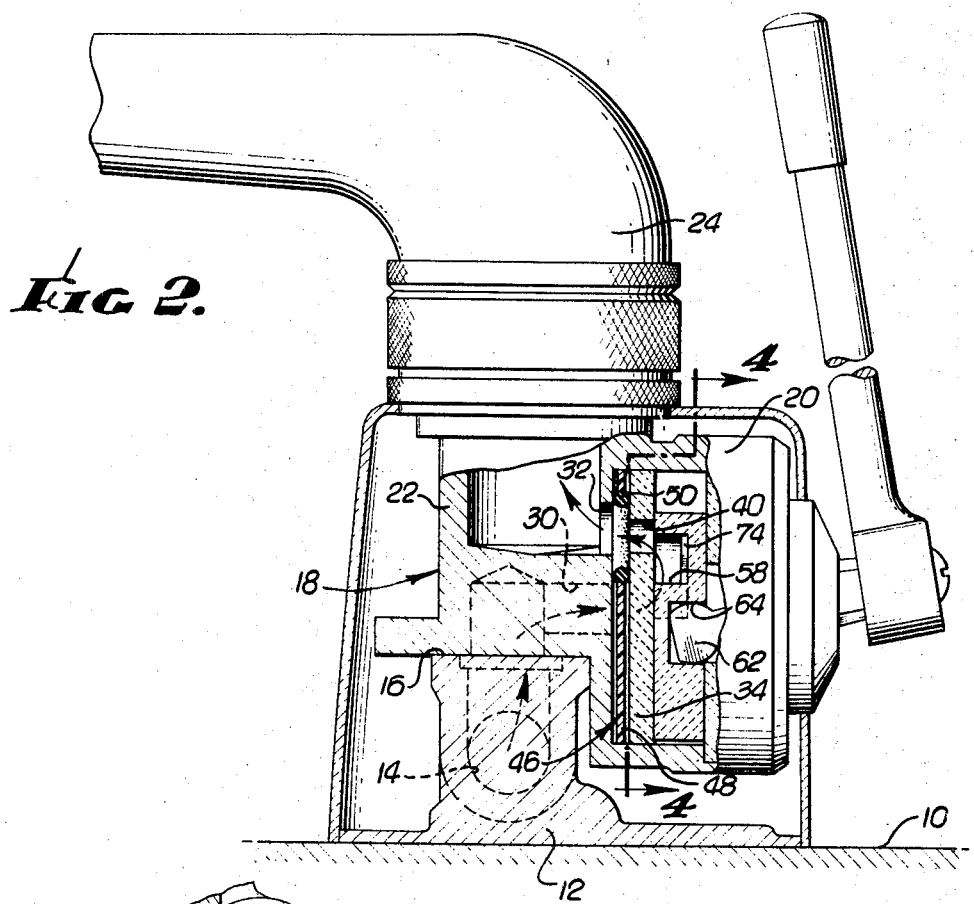
FIG. 2.
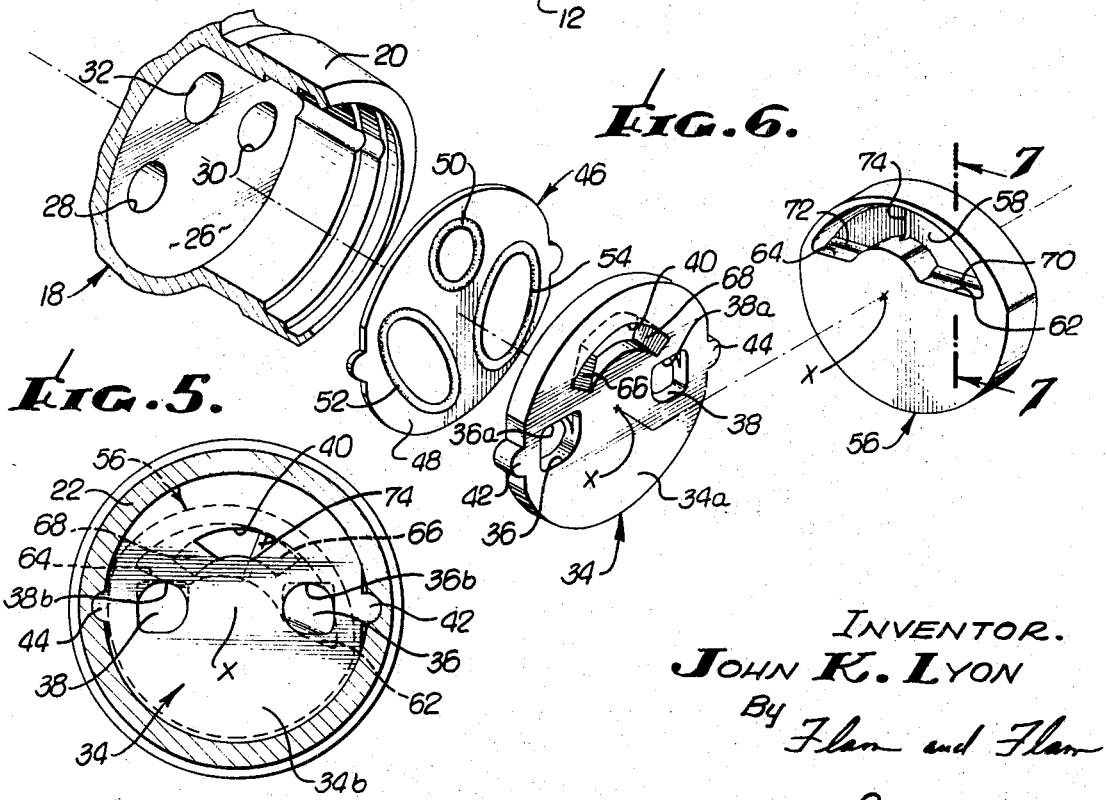
FIG. 6.
FIG. 5.
INVENTOR.
JOHN K. LYON
BY
Flam and Flam
ATTORNEYS.

3,533,444

LOW NOISE LEVEL VALVE STRUCTURE

BRIEF SUMMARY OF INVENTION

This invention relates to plumbing fixtures and particularly to the reduction in the level of noise generated by mixing valves used in fixtures of the type shown and described in my U.S. Letters Pat. No. 3,035,612 and in U.S. Letters Pat. No. 3,324,884 issued to Reinert F. Dornaus. Except for differences in structure and function described hereinafter, my new fixture is the same as that shown and described in said Dornaus patent.

Manufacturers of plumbing fixtures have given attention to the problem of noise generation in tank refill valves for toilets that are traditional offenders. Due to a number of reasons, manufacturers are now required to address themselves to this problem in connection with valves that are not traditional offenders, such as valves at sinks and lavatories. These reasons may include: (1) increased ratio in the construction of multiple dwelling units to single family units; (2) increased use of overhead pipe systems in slab foundation environments which aggravate the secondary noise generation; and (3) increased sophistication on the part of the consuming public.

The essential parts of the valve shown in said patents are, first, a valve seat that has three openings, two inlets and an outlet, and second, a valve plate having a cavity movable to selected degrees of registry or to nonregistry with the openings. The water changes its course by 180° in a short space. Noise is generated for a variety of reasons. First, the water path makes sharp turns and there are abrupt changes in cross-sectional configuration of the flow channel. Second, unless the valve plate is centered, the imbalanced flow of hot and cold water into opposite ends of the valve plate cavity is in effect equivalent to a substantial alteration in the cross-sectional configuration of the flow path. Third, as the cutoff position is approached, the straight edges at the ends of the valve plate cavity define flow segments of progressively decreasing arcuate extent. The flow reduction as a function of valve plate movement is gradual. This results in a prolonged period of throttling and a corresponding prolonged period of noise generation.

The primary object of this invention is to provide an improved mixing valve structure that materially reduces the primary noise level of the valve itself and the secondary noise level induced in connecting piping by vibrations at the valve. In order to accomplish this object, the configuration of the valve plate and the configuration of the valve seat are controlled so as to smooth the flow course especially under imbalanced flow conditions, and the two inlet openings are so formed as to provide a rapid cutoff while maintaining a smooth flow course.

This invention possesses many other advantages and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense.

BRIEF DESCRIPTION OF THE DRAWINGS

FIG. 1 is a vertical sectional view taken through a sink fixture incorporating the present invention, a portion of the apparatus being illustrated in elevation.

FIG. 2 is a view similar to FIG. 1 showing the valve in an open position.

FIGS. 3 and 4 are sectional views taken along planes respectively corresponding to lines 3–3 and 4–4 of FIGS. 1 and 2.

FIG. 5 is a view similar to FIG. 4, but showing the valve in positions in which one of the inlets is closed and the other fully opened.

FIG. 6 is an exploded pictorial view showing the valve plate and the valve seat.

FIG. 7 is an enlarged fragmentary sectional view taken along a plane corresponding to line 7–7 of FIG. 6.

DETAILED DESCRIPTION

The fixture shown by way of example in FIG. 1 is installed at a sink deck 10. The fixture includes a main casting 12 that connects with the hot and cold water supply conduits. Two passages (one of which, 14, appears in FIG. 1) conduct the hot and cold water to spaced openings in an upwardly facing land 16. A valve casting 18 is attached to the land by suitable screws or other fasteners (not shown). The valve casting 18 has a rearwardly extending cup 20 which provides a valve chamber to control the volume and proportion of hot and cold water. Adjoining the bottom of the cup 20 is an upwardly extending nipple 22 forming an outlet from the valve chamber. A swing spout 24 is supported in an appropriate manner at the upper end of the nipple.

As shown in FIG. 6, the inner end wall 26 of the cup has two circular drilled inlet openings 28 and 30 at the lower part, and a circular drilled outlet opening 32 at the upper part. The outlet opening 32 is located above the center of a line forming the two inlet openings. The inlet openings 28 and 30 connect with the hot and cold water supply via suitable ports in the valve casting. The outlet opening 32 laterally intersects the outlet nipple 22.

A ceramic valve seat 34 is held at the inner end of the cup. The seat 34 has a pair of inlet ports or apertures 36 and 38 that register with the valve casting inlets 28 and 30. It also has an arcuate outlet aperture or port 40 that registers with the valve casting outlet 32. The seat 34 is held against angular movement by the aid of a pair of ears 42 and 44.

Interposed between the ceramic seat 34 and the cup end 26 is a seal structure 46. The structure includes a retainer 48 made of molded Delrin or the like, and three O-rings 50, 52 and 54 carried in apertures of the retainer. The O-rings 50, 52 and 54 are normally circular, but are constrained to conform to the configuration of the retainer apertures. As shown in FIGS. 1 and 2 the retainer 48 is thinner than the O-rings. The O-rings thus project in order to be compressed between the cup end 26 and the ceramic seat 34 to confine flow of water between the corresponding apertures of the ceramic seat and the cup end 26.

Cooperable with the outer surface 34a of the ceramic seat 34 is a ceramic valve plate 56. The ceramic valve plate 56 has an arcuate cavity 58 addressed to the seat. The cavity 58 controls the degree of registry of the hot and and cold water ports 36 and 38 with the outlet port 40. The periphery of the plate 56 has a generally lenticular configuration to allow it to be shifted from a position in which one arcuate edge is near the flange of the cup, as in FIG. 3, to a position in which the other arcuate edge is near the flange of the cup, as in FIG. 4. This shifting movement controls the flow volume.

As described in said Dornhaus patent, the ceramic valve plate 56 is confined for movement in a radial type coordinate system wherein the valve plate may be moved angularly about the central cup axis x and shifted radially through the center axis. These modes of movement are determined in part by the aid of guide pins 60 (FIG. 1) and a flat-sided operating projection 62 formed on the operating arm, and in part by a rearwardly opening rectangular recess 64 of the valve plate 56 (FIG. 1) and guide means cooperable with the pins 60.

When the valve plate is in a central angular orientation, as shown in FIGS. 3 and 4, the valve plate may be shifted from a position in which the arcuate cavity 58 is in registry with both the hot and cold water ports 36 and 38 (FIG. 4) to a position (FIG. 3) in which the cavity 58 does not register with either port. In the off position of FIG. 3, the end edges 62 and 64 of the arcuate cavity lie just above the upper edges of the ports 36 and 38. By moving the valve plate 56 downwardly from the position of FIG. 3 to the position of FIG. 4, the edges 62 and 64 progressively sweep across the inlets 36 and 38 to allow flow via the arcuate recess 58 to the seat outlet 40. In the full equal open position of FIG. 4, the inlet ports 36 and 38 are only about half uncovered. Accordingly, by moving the plate 56 angularly about the center axis *x* (FIG. 5) one of the ports opens farther while the other closes. Consequently, a change in proportion does not materially affect total flow.

The seat outlet 40 is arcuate and so positioned that it registers with the arcuate valve plate recess for all open positions of the valve. Moreover, it registers even in the closed position. In order to smooth the course of flow from the seat outlet 40 to the drilled casting outlet 32, the end walls 66 and 68 of the seat outlet 40 slope downwardly from the frontal or outer surface 34*a* to the rear surface 34*b*. A more gradual change in the effective flow area is achieved, and turbulence is correspondingly reduced. For similar purposes, the end walls 70 and 72 (FIG. 6) of the valve plate cavity 58 are curved or inclined to decrease turbulence and to smooth the flow course.

When the valve plate 56 is at a central full open position (FIG. 4) or at other equal flow positions, the streams meet at the center of the cavity 58 with substantially equal force. The hot and cold water streams merge, change course and together move outwardly through the valve seat outlet 40. However, if the valve plate 56 is at a position resulting in unequal flow, then the force of one of the streams will exceed that of the companion stream. This imbalance results in turbulence as the merged streams try to flow through the still centered seat outlet 40. In order to direct and control the course of the hot and cold water streams, a septum 74 is provided in the form of a rib or wall extending across the center of the arcuate recess 58. The septum has a height substantially less than the depth of the cavity, and thus forms only a partial barrier to the crossflow of the streams. The septum directs the stronger stream outwardly of the seat outlet 40. Turbulence and noise is actually reduced.

In order to achieve a sharp or fast cutoff as the valve plate 56 is moved upwardly from the position of FIG. 4 to the position of FIG. 3, or from any intermediate angular position to the "off" position, the upper edges 36*a* and 38*a* of the valve seat inlets 36 and 38 at the frontal or outer surface 34*a*, are straight rather than rounded to parallel the cavity edges 62 and 64 when the plate 56 is centered. In fact, cam structures cause the valve plate to center as it approaches the "off" position. These straight edges provide a greater flow up to the time of ultimate cutoff. This results in flow reduction as a function of valve plate position. The time duration of a large pressure differential across the operative valve openings is accordingly reduced. Hissing and rattling, characteristic of high pressure drop and low volume, are accordingly minimized. The straight edges 36*a* and 38*a* merge gradually to arcuate surfaces 36*b* and 38*b* (FIGS. 3, 4 and 5) on the inside surface 34*b* of the seat 34. A smooth flow course is maintained.

By the aid of the specific configuration of ceramic valve parts, the turbulence normally incident to the abrupt 180° course is materially reduced. Primary and secondary noise generation is correspondingly reduced. Sharpness of cutoff minimizes the noises at cutoff. The ceramic parts are readily ground to achieve the desired configuration.

I claim:

1. In a mixing valve structure having a body provided with a flat wall, there being a pair of inlet openings and an outlet opening formed in the wall, said inlet openings being spaced from each other, and the outlet opening located substantially between said inlet openings, the combination therewith of a seat member positioned adjacent said wall, and having a pair of inlet ports and an outlet port registering respectively with said inlet openings and said outlet opening, said outlet port being extended so that its ends are positioned adjacent the respective inlet ports, the end walls of said outlet port sloping inwardly of the seat member toward said outlet opening of said wall to define a convergent fluid flow path; and a valve plate member confined for movement in two coordinates along one side of said seat member, said valve plate member having an elongated cavity registrable with said outlet port, and having ends movable in one coordinate to change the relative registry of said cavity with said inlet ports and movable in another coordinate to change the degree of registry of said cavity with both of said ports; said cavity having an intermediate septum or partial wall extending from the bottom of said cavity to form a partial barrier to direct fluid flow to said outlet port under conditions of imbalanced registry.

2. The combination as set forth in claim 1 in which the ends of said cavity slope inwardly of the cavity to minimize the curvature of the flow path at the ends of said cavity.

3. The combination as set forth in claim 2 in which said inlet ports and the ends of said cavity have a configuration to provide high flow reduction as a function of valve plate member movement in said other coordinate at the region of cutoff.

4. The combination as set forth in claim 1 in which said inlet ports and the ends of said cavity have a configuration to provide high flow reduction as a function of valve plate member movement in said other coordinate at the region of cutoff.

5. In a mixing valve structure having a body provided with a flat wall, there being a pair of inlet openings and an outlet opening formed in the wall, said inlet openings being spaced from each other, said outlet opening being located laterally on one side of the center of a line joining said inlet openings, the combination therewith of a ceramic like plate forming a seat member and held in position relative to said wall, said seat member having a pair of inlet ports and an outlet port all registering respectively with said inlet openings and said outlet opening, said outlet port being substantially arcuately bowed with ends positioned adjacent the respective inlet ports, the end walls of said outlet opening sloping inwardly of the seat member toward the center thereof to define a convergent fluid flow path; and a ceramic like valve plate member confined for movement in a circular coordinate system about said center, said valve plate having an arcuate cavity opposed to said seat member and larger than said outlet port, the ends of said arcuate cavity being positioned to traverse across edges of said inlet ports on said one side, said valve plate being movable arcuately about said center to change the relative registry of said cavity with said inlet ports, and shiftable radially of said center simultaneously to change the degree of registry of said cavity with both of said ports as well as to interrupt registry therewith.

6. The combination as set forth in claim 5 in which the ends of said cavity slope inwardly of the cavity to minimize the curvature of the flow path at the ends of said cavity.

7. The combination as set forth in claim 5 in which said cavity has an intermediate septum or partial barrier to direct fluid flow to said outlet port under conditions of imbalanced registry.

8. The combination as set forth in claim 5 in which the edges of said inlet ports on the said one side are straight, the end edges of said cavity also being straight to provide high flow reduction as a function of valve plate member movement at the region of cutoff.

9. The combination as set forth in claim 8 in which the corresponding edges on the surface of said valve plate member opposed to said wall are curved to conform to the configuration of said inlet openings.

10. The combination as set forth in claim 5 in which the ends of said cavity slope inwardly of the cavity to minimize the curvature of the flow path at the ends of said cavity and in which said cavity has an intermediate septum or partial barrier to direct fluid flow to said outlet port under conditions of imbalanced registry.

11. The combination as set forth in claim 5 in which the ends of said cavity slope inwardly of the cavity to minimize the curvature of the flow path at the ends of said cavity and in which the edges of said inlet ports on the said one side are straight, the end edges of said cavity also being straight to provide high flow reduction as a function of valve plate member movement at the region of cutoff.

12. The combination as set forth in claim 5 in which said cavity has an intermediate septum or partial barrier to direct fluid flow to said outlet port under conditions of imbalanced registry and in which the edges of said inlet ports on said one side are straight, the end edges of said cavity also being straight to provide high flow reduction as a function of valve plate member movement at the region of cutoff.

13. The combination as set forth in claim 12 in which the ends of said cavity slope inwardly of the cavity to minimize the curvature of the flow path at the ends of said cavity.

14. In a mixing valve structure having a body provided with a flat wall, there being a pair of inlet openings and an outlet opening formed in the wall, said inlet openings being spaced from each other, said outlet opening being located laterally on one side of the center of a line joining said inlet openings, the combination therewith of a ceramic like plate forming a seat member and held in position relative to said wall, said seat member having a pair of inlet ports and an outlet port all registering respectively with said inlet openings and said outlet opening, said outlet port being substantially arcuately bowed with ends positioned adjacent the respective inlet ports, and an ceramic like valve plate member confined for movement in a circular coordinate system about said center, said valve plate having an arcuate cavity opposed to said seat member and larger than said outlet port, the ends of said arcuate cavity being positioned to traverse across edges of said inlet ports on said one side, said valve plate being movable arcuately about said center to change the relative registry of said cavity with said inlet ports, and shiftable radially of said center simultaneously to change the degree of registry of said cavity with both of said ports as well as to interrupt registry therewith; the edges of said inlet ports on the said one side being straight, the end edges of said cavity being correspondingly straight to provide high flow reduction as a function of valve plate member position.

15. The combination as set forth in claim 14 in which the end walls of said outlet opening slope inwardly of the seat member toward the center thereof to define a convergent fluid flow path.

16. The combination as set forth in claim 14 in which the ends of said cavity slope inwardly of said cavity to minimize the curvature of the flow path at the ends of said cavity.

17. The combination as set forth in claim 14 in which said cavity has an intermediate septum or partial barrier to direct fluid flow to said outlet port under conditions of imbalanced registry.

18. The combination as set forth in claim 14 in which the end walls of said outlet opening slope inwardly of the seat member toward the center thereof to define a convergent fluid flow path, and in which the ends of said cavity slope inwardly of said cavity to minimize the curvature of the flow path at the ends of said cavity.

19. The combination as set forth in claim 14 in which the end walls of said outlet opening slope inwardly of the seat member toward the center thereof to define a convergent fluid flow path, and in which said cavity has an intermediate septum or partial barrier to direct fluid flow to said outlet port under conditions of imbalanced registry.

20. The combination as set forth in claim 14 in which the ends of said cavity slope inwardly of said cavity to minimize the curvature of the flow path at the ends of said cavity, and in which said cavity has an intermediate septum or partial barrier to direct fluid flow to said outlet port under conditions of imbalanced registry.

21. The combination as set forth in claim 14 in which the end walls of said outlet opening slope inwardly of the seat member toward the center thereof to define a convergent fluid flow path, in which the ends of said cavity slope inwardly of said cavity to minimize the curvature of the flow path at the ends of said cavity, and in which said cavity has an intermediate septum or partial barrier to direct fluid flow to said outlet port under conditions of imbalanced registry.

22. In a mixing valve structure having a body provided with a flat wall, there being a pair of inlet openings and an outlet opening formed in the wall, said inlet openings being spaced from each other, said outlet opening being located substantially between said inlet openings, the combination therewith of a seat member positioned adjacent said wall, and having a pair of inlet ports and an outlet port registering respectively with said inlet openings and said outlet opening; and a valve plate member confined for movement in two coordinates along one side of said seat member, said valve plate member having an elongated cavity registrable with said outlet port, and having ends movable in one coordinate to change the relative registry of said cavity with said inlet ports and movable in another coordinate to change the degree of registry of said cavity with both of said ports; the ends of said cavity sloping inwardly of the cavity to minimize the curvature of the flow path at the ends of said cavity.

23. The combination as set forth in claim 22 in which said outlet port is extended so that its ends are positioned adjacent the respective inlet ports, the end walls of said outlet ports sloping inwardly of the seat member toward said outlet opening of said wall to define a convergent fluid flow path.

24. The combination as set forth in claim 23 in which said seat member and said valve plate member are made of ceramic-like material; said outlet port being arcuately bowed with ends located adjacent said inlet ports respectively; said valve plate having an arcuate cavity opposed to said seat member and larger than said outlet port, the ends of said arcuate cavity being positioned to traverse across edges of said inlet ports on said one side, said valve plate being movable arcuately about said center to change the relative registry of said cavity with said inlet ports and shiftable radially of said center simultaneously to change the degree of registry of said cavity with both of said ports as well as to interrupt registry therewith.

25. The combination as set forth in claim 24 in which the edges of said inlet ports on the said one side are straight, the end edges of said cavity also being straight thus to provide said high flow reduction as a function of valve plate member movement at the region of cutoff.

26. The combination as set forth in claim 25 in which the corresponding edges on the surface of said valve seat member opposed to said wall are curved to conform to the configuration of said inlet openings.

27. The combination as set forth in claim 22 in which said inlet ports and the ends of said cavity have a configuration to provide high flow reduction as a function of valve plate member movement in said other coordinate at the region of cutoff.

28. In a mixing valve structure having a body provided with a flat wall, there being a pair of inlet openings and an outlet opening formed in the wall, said inlet openings being spaced from each other, said outlet opening being located substantially between said inlet openings, the combination therewith of a seat member positioned adjacent said wall, and having a pair of inlet ports and an outlet port registering respectively with said inlet openings and said outlet opening; and a valve plate member confined for movement in two coordinates along one side of said seat member, said valve plate member having an elongated cavity registrable with said outlet port, and having ends movable in one coordinate to change the relative registry of said cavity with said inlet ports and movable in another coordinate to change the degree of registry of said cavity with both of said ports; said cavity having an intermediate septum or partial wall extending from the bottom of said cavity to form a partial barrier to direct fluid flow to said outlet port under conditions of imbalanced registry.

29. The combination as set forth in claim 28 in which the ends of said cavity slope inwardly of the cavity to minimize the curvature of the flow path at the ends of said cavity.

30. The combination as set forth in claim 29 in which said outlet port is extended so that its ends are positioned adjacent the respective inlet ports, the end walls of said outlet ports sloping inwardly of the seat member toward said outlet opening of said wall to define a convergent fluid flow path.